(12) United States Patent
Li

(10) Patent No.: US 11,391,639 B2
(45) Date of Patent: Jul. 19, 2022

(54) PRESSURE SENSING DEVICE, MANUFACTURING METHOD OF SENSOR, AND MANUFACTURING METHOD OF PIEZORESISTIVE MATERIAL LAYER

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Yingyi Li, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 407 days.

(21) Appl. No.: 16/480,459

(22) PCT Filed: Jan. 22, 2019

(86) PCT No.: PCT/CN2019/072648
§ 371 (c)(1),
(2) Date: Jul. 24, 2019

(87) PCT Pub. No.: WO2019/223353
PCT Pub. Date: Nov. 28, 2019

(65) Prior Publication Data
US 2021/0356343 A1 Nov. 18, 2021

(30) Foreign Application Priority Data
May 25, 2018 (CN) .......................... 201820793054.1

(51) Int. Cl.
*G01L 9/06* (2006.01)
*G01L 19/08* (2006.01)

(52) U.S. Cl.
CPC ................ *G01L 9/06* (2013.01); *G01L 19/08* (2013.01)

(58) Field of Classification Search
CPC . G01L 19/0645; G01L 9/0072; G01L 19/147; G01L 19/0084; G01L 9/0042;
(Continued)

(56) References Cited

U.S. PATENT DOCUMENTS 9,645,028 B2* 5/2017 Choong ................ G01L 1/2206
10,564,757 B2* 2/2020 Guo ....................... G06F 3/0445
(Continued)

FOREIGN PATENT DOCUMENTS

CN          1305907 A    8/2001
CN     104220964 A    12/2014
(Continued)

*Primary Examiner* — Andre J Allen
(74) *Attorney, Agent, or Firm* — Brooks Kushman P.C.

(57) ABSTRACT

The present disclosure provides a pressure sensing device, including a sensor. The sensor includes a sheet-like piezoresistive material layer, and a first electrode structure and the second electrode structure arranged at opposite sides of the piezoresistive material layer respectively. At least one of the first electrode structure and the second electrode structure is provided with one or more protrusions at a surface facing the piezoresistive material layer, and the surface facing the piezoresistive material layer with the one or more protrusions forms an uneven surface.

20 Claims, 5 Drawing Sheets

(58) Field of Classification Search
CPC .. G01L 19/0007; G01L 9/0073; G01L 13/025; G01L 9/0075; G01L 19/0038; G01L 9/0054; G01L 9/0055; G01L 19/04; G01L 19/148; G01L 7/00; G01L 7/04; G01L 19/14; G01L 19/143; G01L 15/00; G01L 19/0092; G01L 17/00; G01L 7/18; G01L 9/0051; G01L 9/065; G01L 7/041; G01L 9/0052; G01L 9/12; G01L 9/125; G01L 19/0618; G01L 19/0609; G01L 19/003; G01L 19/0627; G01L 7/16; G01L 19/0636; G01L 19/0046; G01L 9/06; G01L 7/081; G01L 19/0023; G01L 9/007; G01L 13/02; G01L 9/0022; G01L 19/142; G01L 7/043; G01L 9/008; G01L 19/02; G01L 19/08; G01L 19/141; G01L 9/0002; G01L 23/18; G01L 19/0672; G01L 9/006; G01L 19/0681; G01L 11/02; G01L 9/0077; G01L 19/0069; G01L 19/12; G01L 27/005; G01L 23/10; G01L 7/082; G01L 9/0044; G01L 19/0015; G01L 7/063; G01L 21/12; G01L 19/146; G01L 27/007; G01L 9/0001; G01L 27/002; G01L 11/025; G01L 9/0026; G01L 11/00; G01L 19/0654; G01L 9/0089; G01L 9/0047; G01L 9/045; G01L 13/026; G01L 9/14; G01L 9/0025; G01L 11/008; G01L 19/00; G01L 9/16; G01L 19/0061; G01L 7/22; G01L 13/00; G01L 9/0019; G01L 9/0076; G01L 7/08; G01L 9/08; G01L 19/069; G01L 19/086; G01L 19/083; G01L 9/0035; G01L 21/00; G01L 9/0005; G01L 9/10; G01L 11/006; G01L 9/0008; G01L 9/04; G01L 19/10; G01L 9/0016; G01L 9/0041; G01L 1/2281; G01L 1/18; G01L 19/16; G01L 9/0079; G01L 11/004; G01L 9/0027; G01L 9/0057; G01L 13/023; G01L 19/06; G01L 19/0663; G01L 7/048; G01L 9/00; G01L 9/0086; G01L 9/0048; G01L 11/04; G01L 7/166; G01L 23/24; G01L 9/0091; G01L 1/02; G01L 7/182; G01L 9/0036; G01L 9/0039; G01L 11/002; G01L 23/125; G01L 23/22; G01L 27/00; G01L 9/0045; G01L 9/0061; G01L 1/20; G01L 9/0013; G01L 9/0092; G01L 19/145; G01L 9/0098; G01L 1/2293; G01L 9/0033; G01L 1/142; G01L 21/04; G01L 7/104; G01L 9/0007; G01L 9/02; G01L 21/22; G01L 9/0064; G01L 9/0083; G01L 7/24; G01L 9/0029; G01L 23/16; G01L 1/205; G01L 23/08; G01L 7/022; G01L 1/148; G01L 7/088; G01L 7/163; G01L 13/06; G01L 23/222; G01L 9/0085; G01L 1/16; G01L 5/14; G01L 1/2212; G01L 21/14; G01L 9/0004; G01L 9/085; G01L 1/14; G01L 1/2287; G01L 23/02; G01L 7/061; G01L 9/003; G01L 9/025; G01L 9/002; G01L 9/0058; G01L 23/28; G01L 7/02; G01L 1/162; G01L 1/246; G01L 13/028; G01L 19/0076; G01L 9/0095; G01L 9/105; G01L 1/2231; G01L 19/149; G01L 21/10; G01L 7/086; G01L 5/228; G01L 7/024; G01L 7/12; G01L 9/0032; G01L 9/0038; G01L 7/06; G01L 1/005; G01L 9/0082; G01L 1/2206; G01L 1/2262; G01L 11/06; G01L 13/021; G01L 1/24; G01L 23/26; G01L 27/02; G01L 1/125; G01L 23/00; G01L 9/0094; G01L 1/144; G01L 1/165; G01L 1/2268; G01L 1/26; G01L 21/34; G01L 23/221; G01L 7/068; G01L 7/102; G01L 7/187; G01L 7/20; G01L 9/0097; G01L 1/146; G01L 1/225; G01L 19/144; G01L 23/12; G01L 23/32; G01L 7/045; G01L 7/14; G01L 1/086; G01L 1/241; G01L 21/30; G01L 1/245; G01L 13/04; G01L 17/005; G01L 21/32; G01L 23/145; G01L 5/18; G01L 7/108; G01L 9/18; G01L 1/127; G01L 1/183; G01L 1/22; G01L 1/2218; G01L 5/0047; G01L 9/001; G01L 9/0023; G01L 1/044; G01L 1/10; G01L 1/106; G01L 5/0076; G01L 5/165; G01L 9/0017; G01L 9/0088; G01L 1/186; G01L 1/243; G01L 23/223; G01L 25/00; G01L 3/245; G01L 5/0052; G01L 5/225; G01L 5/226; G01L 7/065; G01L 1/00; G01L 1/08; G01L 21/16; G01L 21/24; G01L 3/10; G01L 3/1485; G01L 5/0004; G01L 5/162; G01L 9/0014; G01L 9/005; G01L 1/04; G01L 1/103; G01L 1/2275; G01L 21/02; G01L 21/26; G01L 23/225; G01L 3/102; G01L 3/105; G01L 5/0038; G01L 5/223; G01L 5/24; G01L 7/026; G01L 7/028; G01L 7/10; G01L 9/0011; G01L 1/083; G01L 1/12; G01L 1/242; G01L 1/247; G01L 1/255; G01L 2009/0069; G01L 21/08; G01L 21/36; G01L 23/04; G01L 23/14; G01L 3/103; G01L 5/00; G01L 5/0028; G01L 5/0033; G01L 5/102; G01L 5/133; G01L 5/1627; G01L 5/166; G01L 5/243; G01L 7/185; G01L 1/042; G01L 1/122; G01L 1/2225; G01L 1/2243; G01L 1/2256; G01L 1/248; G01L 2009/0066; G01L 2009/0067; G01L 21/06; G01L 23/06; G01L 23/085; G01L 23/30; G01L 3/00; G01L 3/06; G01L 3/1478; G01L 3/1492; G01L 3/18; G01L 3/24; G01L 3/242; G01L 5/0057; G01L 5/08; G01L 5/10; G01L 5/101; G01L 5/108; G01L 5/167; G01L 5/171; G01L 5/22; G01L 5/28

USPC .................................................. 73/700–756

See application file for complete search history.

(56) References Cited

U.S. PATENT DOCUMENTS

| | | | |
|---|---|---|---|
| 11,162,858 B2* | 11/2021 | Wettels | .................. G01L 1/205 |
| 2009/0272201 A1* | 11/2009 | Loeb | ...................... G01L 5/228 |
| | | | 73/862.041 |
| 2013/0285970 A1 | 10/2013 | Ahn et al. | |
| 2015/0059486 A1* | 3/2015 | Choong | ................ G01L 9/0052 |
| | | | 73/727 |
| 2017/0356815 A1 | 12/2017 | Madden et al. | |

FOREIGN PATENT DOCUMENTS

| | | |
|---|---|---|
| CN | 104706335 A | 6/2015 |
| CN | 105021329 A | 11/2015 |
| CN | 106017748 A | 10/2016 |
| CN | 106092390 A | 11/2016 |
| CN | 106188630 A | 12/2016 |

(56) References Cited

FOREIGN PATENT DOCUMENTS

| | | | |
|---|---|---|---|
| CN | 206132280 U | | 4/2017 |
| CN | 106768520 | * | 5/2017 |
| CN | 107101754 A | | 8/2017 |
| CN | 108760102 A | | 11/2018 |
| CN | 208140284 U | | 11/2018 |
| CN | 110440961 A | * | 11/2019 |
| CN | 111735562 B | * | 1/2021 |
| CN | 110857894 B | * | 6/2021 |
| CN | 109724723 B | * | 9/2021 |
| WO | 2017216793 A1 | | 12/2017 |
| WO | WO-2018232326 A1 | * | 12/2018 ............... G01L 1/20 |

* cited by examiner

PRESSURE SENSING DEVICE, MANUFACTURING METHOD OF SENSOR, AND MANUFACTURING METHOD OF PIEZORESISTIVE MATERIAL LAYER

CROSS-REFERENCE TO RELATED APPLICATIONS

This application is the U.S. national phase of PCT Application No. PCT/CN2019/072648 filed on Jan. 22, 2019, which claims priority to Chinese Patent Application No. 201820793054.1 filed on May 25, 2018, which are incorporated herein by reference in their entireties.

TECHNICAL FIELD

The present disclosure relates to the field of pressure detection technology, in particular to a pressure sensing device, a method for manufacturing a sensor, and a method for manufacturing a piezoresistive material layer.

BACKGROUND

Resistive pressure sensor is a sensor capable of converting a measured pressure change into a resistance change. Usually, a conventional resistive pressure sensor includes a piezoresistive material layer and two templates each containing an electrode layer, and the piezoresistive material layer is arranged between the two electrode layers. The piezoresistive material layer is usually a conductive elastic thin film made of an elastic material and a conductive material which are mixed together. When a pressure is applied to the elastic thin film, a contact level between the conductive materials or a contact area between the thin film and the electrode layers increases, so as to change a resistance of the piezoresistive material layer. However, the elastic material has limited elasticity, and when a relatively small pressure is applied, it is difficult to deform the piezoresistive material layer and change its resistance, and thereby the conventional resistive pressure sensor has insufficient sensitivity.

SUMMARY

In one aspect, the present disclosure provides in some embodiments a pressure sensing device, including a sensor. The sensor includes a sheet-like piezoresistive material layer, and a first electrode structure and the second electrode structure arranged at opposite sides of the piezoresistive material layer respectively. At least one of the first electrode structure and the second electrode structure is provided with one or more protrusions at a surface facing the piezoresistive material layer, and the surface facing the piezoresistive material layer with the one or more protrusions forms an uneven surface.

In some possible embodiments of the present disclosure, when the sensor is not pressed, the uneven surface of the at least one of the first electrode structure and the second electrode structure is in incomplete contact with the piezoresistive material layer.

In some possible embodiments of the present disclosure, the pressure sensing device further includes at least one flexible substrate arranged at at least one side of the sensor.

In some possible embodiments of the present disclosure, the piezoresistive material layer includes porous foam body and graphene particles absorbed on the porous foam body.

In some possible embodiments of the present disclosure, the first electrode structure includes a first configuration layer and a first electrode layer arranged between the first configuration layer and the piezoresistive material layer, the first configuration layer is provided with the uneven surface facing the piezoresistive material layer, and the first electrode layer is coated onto the first configuration layer; and/or the second electrode structure includes a second configuration layer and a second electrode layer arranged between the second configuration layer and the piezoresistive material layer, the second configuration layer is provided with the uneven surface facing the piezoresistive material layer, and the second electrode layer is coated onto the second configuration layer.

In some possible embodiments of the present disclosure, the surface of at least one of the first configuration layer and the second configuration layer facing the piezoresistive material layer is provided with a plurality of convex points arranged in a matrix form, and the surface of at least one of the first configuration layer and the second configuration layer facing the piezoresistive material layer with the plurality of convex points forms the uneven surface.

In some possible embodiments of the present disclosure, the first electrode structure includes a plurality of first strip-like electrodes arranged parallel to each other, the second electrode structure includes a plurality of second strip-like electrodes arranged parallel to each other, and each first strip-like electrode intersects the plurality of second strip-like electrodes.

In some possible embodiments of the present disclosure, the pressure sensing device further includes an attachment layer covering a surface of the sensor.

In some possible embodiments of the present disclosure, the pressure sensing device further includes an indicator electrically coupled to the sensor and configured to indicate a level of a pressure applied to the sensor.

In some possible embodiments of the present disclosure, each of the first electrode structure and the second electrode structure is of a sheet-like shape, the indicator includes a Light-Emitting Diode (LED) lamp coupled in series to the sensor and configured to display different colors in accordance with different voltages applied thereto.

In some possible embodiments of the present disclosure, the first electrode structure includes a plurality of first strip-like electrodes arranged parallel to each other, the second electrode structure includes a plurality of second strip-like electrodes arranged parallel to each other, each first strip-like electrode intersects the plurality of second strip-like electrodes, and the indicator includes an LED lamp, one end of which is coupled to one end of each first strip-like electrode, and the other end of which is coupled to one end of each second strip-like electrode.

In some possible embodiments of the present disclosure, the first electrode structure includes a plurality of first strip-like electrodes arranged parallel to each other, the second electrode structure includes a plurality of second strip-like electrodes arranged parallel to each other, each first strip-like electrode intersects the plurality of second strip-like electrodes to form a plurality of pressure sensing elements, the indicator includes a plurality of LED lamps corresponding to the plurality of pressure sensing elements in a one-to-one correspondence manner, one end of each LED lamp is coupled to an end of the first strip-like electrode of a corresponding pressure sensing element, and the other end of each LED lamp is coupled to an end of the second strip-like electrode of the corresponding pressure sensing element.

In some possible embodiments of the present disclosure, the LED lamp is a full-color LED lamp.

In some possible embodiments of the present disclosure, when the voltage applied to the LED lamp is smaller than or equal to a first threshold, a red (R) color is displayed by the LED lamp, when the voltage applied to the LED lamp is greater than the first threshold and smaller than or equal to a second threshold, a green (G) color is displayed by the LED lamp, and when the voltage applied to the LED lamp is greater than the second threshold, a blue (B) color is displayed by the LED lamp.

In some possible embodiments of the present disclosure, the pressure sensing device further includes a processor electrically coupled to the sensor, and configured to receive an electrical signal from the sensor, and convert the electrical signal into a pulse signal or a heartbeat signal.

In some possible embodiments of the present disclosure, the pressure sensing device further includes a transmitter coupled to the processor, and configured to transmit the pulse signal or the heartbeat signal to an external reception device.

In another aspect, the present disclosure provides in some embodiments a method for manufacturing a sensor of the above-mentioned pressure sensing device, including: coating an insulation flexible material onto a template with concave points arranged in a matrix form; molding and baking the insulation flexible material on the template to form a thin film with convex points arranged in a matrix form, so as to prepare a configuration layer; removing the thin film with the convex points off from the template; forming an electrode layer on a surface of the thin film with the convex points through plating, so as to prepare at least one electrode structure; and after the acquisition of the at least one electrode structure, arranging the at least one electrode structure in such a manner that a surface of the at least one electrode structure with the convex points is located at an upper or lower side of a sheet-like piezoresistive material layer, so as to prepare the sensor having the at least one electrode structure with a non-planar surface.

In some possible embodiments of the present disclosure, the non-planar surface of the at least one electrode structure is uneven.

In yet another aspect, the present disclosure provides in some embodiments a method for manufacturing a piezoresistive material layer for the above-mentioned pressure sensing device, including: forming a porous foam body made of a polyurethane (PU) material into a sheet-like structure; immersing the porous foam body into a graphene-dispersed solvent, so as to enable the porous foam body to absorb an entirety of graphene particles; and baking an entirety of the porous foam body absorbing the graphene particles so as to prepare the piezoresistive material layer which is electrically conductive.

In some possible embodiments of the present disclosure, the sheet-like structure has a thickness of 1 mm to 10 mm.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
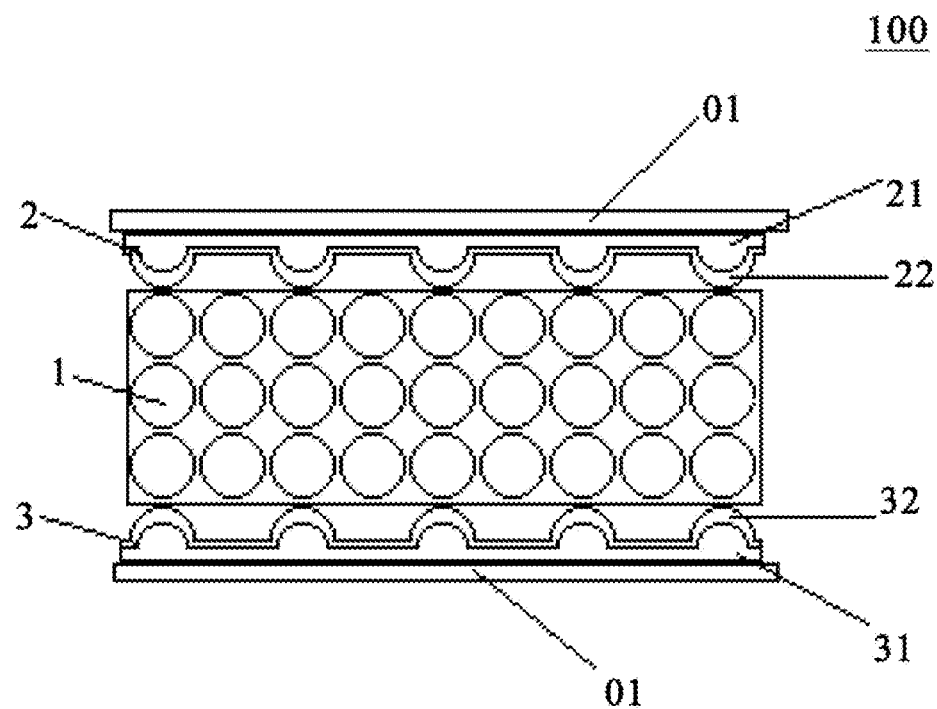
FIG. 1 is a schematic view showing a pressure sensing device according to a first embodiment of the present disclosure.

The present disclosure provides in some embodiments a pressure sensing device which, as shown in FIG. 1, includes a sensor 100. The sensor 100 includes a sheet-like piezoresistive material layer 1, and a first electrode structure 2 and a second electrode structure 3 arranged at opposite sides of the piezoresistive material layer 1 respectively. At least one of the first electrode structure 2 and/or the second electrode structure 3 is provided with an uneven surface facing the piezoresistive material layer 1.

Correspondingly, when the sensor 100 is not pressed, the uneven surface of the at least one of the first electrode structure 2 and/or the second electrode structure 3 is in incomplete contact with the piezoresistive material layer 1.

According to the pressure sensing device in the embodiments of the present disclosure, at least one of the electrode structures (i.e., the first electrode structure 2 and/or the second electrode structure 3) is provided with the uneven surface opposite to the piezoresistive material layer 1. When the sensor 100 is not pressed, the uneven surface of at least one of the electrode structures is in incomplete contact with the piezoresistive material layer 1, i.e., there may exist a very small contact area between the piezoresistive material layer 1 and the electrode structure. When the sensor is pressed, the contact area between the piezoresistive material layer 1 and the electrode structure may increase rapidly, so as to improve the pressure sensing accuracy. Here, the uneven surface may refer to a surface with two or more protrusions, and the number, shapes and heights of the protrusions will be not particularly defined herein.

In the embodiments of the present disclosure, it is able to improve the accuracy of the pressure sensing device through the uneven surface of the electrode structure and the piezoresistive material layer, so a thickness of the piezoresistive material layer 1 is reduced appropriately. In some possible embodiments of the present disclosure, the piezoresistive material layer 1 may have a thickness of 1 mm to 10 mm, so as to reduce a thickness of the entire sensor.

In the embodiments of the present disclosure, each of the electrode structures 2, 3 is provided with the uneven surface in various ways, which will be described hereinafter illustratively.

In some possible embodiments of the present disclosure, as shown in FIG. 1, the first electrode structure 2 may include a first configuration layer 21 and a first electrode layer 22 arranged between the first configuration layer 21 and the piezoresistive material layer 1, the first configuration layer 21 is provided with an uneven surface facing the piezoresistive material layer 1, and the first electrode layer 22 is coated onto the first configuration layer 21 so as to be provided with an uneven surface facing the piezoresistive material layer 1; and/or the second electrode structure 3 may include a second configuration layer 31 and a second electrode layer 32 arranged between the second configuration layer 31 and the piezoresistive material layer 1, the second configuration layer 31 is provided with an uneven surface facing the piezoresistive material layer 1, and the second electrode layer 32 is coated onto the second configuration layer 31 so as to be provided with an uneven surface facing the piezoresistive material layer 1.

In the embodiments of the present disclosure, the at least one configuration layer with an uneven surface (e.g., the first configuration layer 21 and/or the second configuration layer 31) may serve as a support plate and a template for forming the at least one electrode layer with an uneven surface, so the manufacture method thereof is simple. The at least one configuration layer is made of an insulation flexible material.

In addition, in order to support and protect the sensor, the pressure sensing device may further include at least one flexile substrate 01 arranged on at least one side of the sensor 100. In other words, the flexible substrate 01 is arranged at one side of the sensor 100, or as shown in FIG. 1, two flexible substrates 01 are arranged at both sides of the sensor 100 respectively.

In some possible embodiments of the present disclosure, the surface of the at least one of the first configuration layer 21 and the second configuration layer 31 is provided with a plurality of convex points arranged in a matrix form, and the surface of at least one of the first configuration layer and the second configuration layer facing the piezoresistive material layer with the plurality of convex points forms the uneven surface. In this way, the convex points on the electrode structure are distributed uniformly, and contact positions of the electrode structure with the piezoresistive material layer 1 are distributed uniformly too, so as to further improve the performance of the sensor.

In some possible embodiments of the present disclosure, each of the first electrode structure 2 and the second electrode structure 3 is provided with the uneven surface facing the piezoresistive material layer 1.

Figure 2:
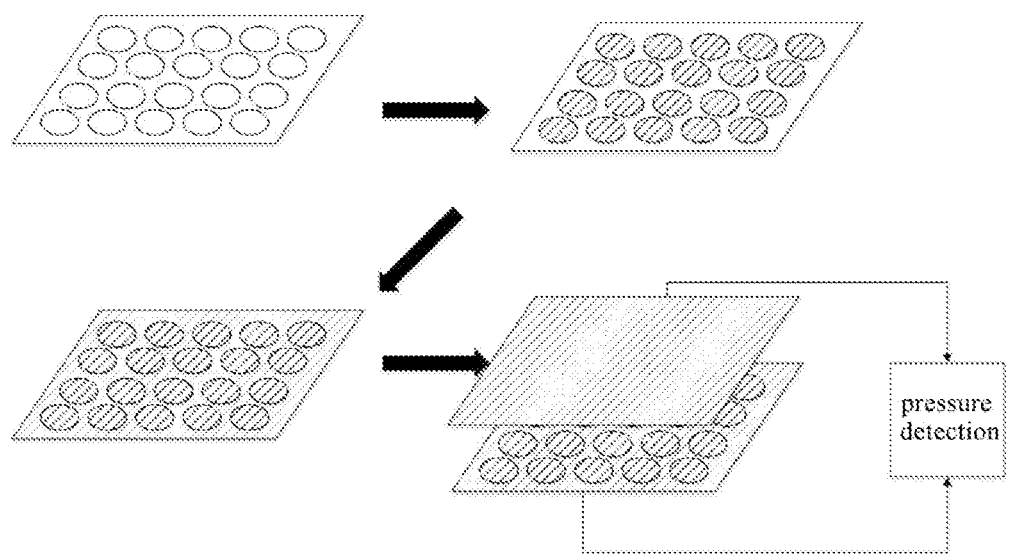
FIG. 2 is a schematic view showing a method for manufacturing a sensor according to some embodiments of the present disclosure.

As shown in FIG. 2, the sensor in the embodiments of the present disclosure is manufactured as follows.

Step 1: coating the insulation flexible material onto the template with concave points arranged in a matrix form.

Step 2: molding and baking the insulation flexible material on the template to form a thin film with convex points arranged in a matrix form, so as to prepare the configuration layer.

Step 3: removing the thin film with the convex points off from the template.

Step 4: forming an electrode layer on a surface of the thin film with the convex points through plating, so as to prepare the at least one electrode structure.

Step 5: after the acquisition of the at least one electrode structure, arranging the at least one electrode structure in such a manner that the surface of the at least one electrode structure with the convex points is located at an upper or lower side of the sheet-like piezoresistive material layer 1, so as to prepare the sensor having the at least one electrode structure with the uneven surface.

In the above embodiment of the present disclosure, each of the first electrode structure 2 and the second electrode structure 3 is provided with the uneven surface facing the piezoresistive material layer 1. Of course, in some other embodiments of the present disclosure, merely one of the electrode structures is provided with the uneven surface facing the piezoresistive material layer 1. When merely one of the electrode structures is provided with the uneven surface facing the piezoresistive material layer 1, the other electrode structure may not include the configuration layer. Instead it has a planar structure.

In the embodiments of the present disclosure, the electrode layer of the first electrode structure 2 and the electrode layer of the second electrode structure 3 may each be made of a metal material having excellent conductivity, e.g., aluminium, copper or silver. Of course, they may also be made of a transparent indium tin oxide (ITO) material.

In the embodiments of the present disclosure, the piezoresistive material layer 1 is made of various piezoresistive materials. In some possible embodiments of the present disclosure, the piezoresistive material layer 1 may include a porous foam body and graphene particles absorbed on the porous foam body. The porous foam body is made of a PU polymer material. Due to excellent elasticity, the PU polymer material is easily deformed when a pressure is applied thereto, and is easily restored to its original form when the pressure disappears. In addition, the PU polymer material has an excellent porous structure, so as to absorb the conductive graphene particles in a better manner.

In addition, the piezoresistive material layer 1 is manufactured as follows.

Step 1: forming the porous foam body made of the PU material into a sheet-like structure having a thickness of, e.g., 1 mm to 10 mm.

Step 2: immersing the porous foam body into a graphene-dispersed solvent, so as to enable the porous foam body to absorb an entirety of the graphene particles.

Step 3: baking an entirety of the porous foam body absorbing the graphene particles so as to prepare the piezoresistive material layer 1 which is electrically conductive.

Here, when the piezoresistive material layer 1 is manufactured through absorbing the graphene particles by the porous foam body, it is able to reduce the manufacture cost, simplify the manufacture process, and improve the pressure sensitivity of the resultant piezoresistive material layer 1.

Figure 3:
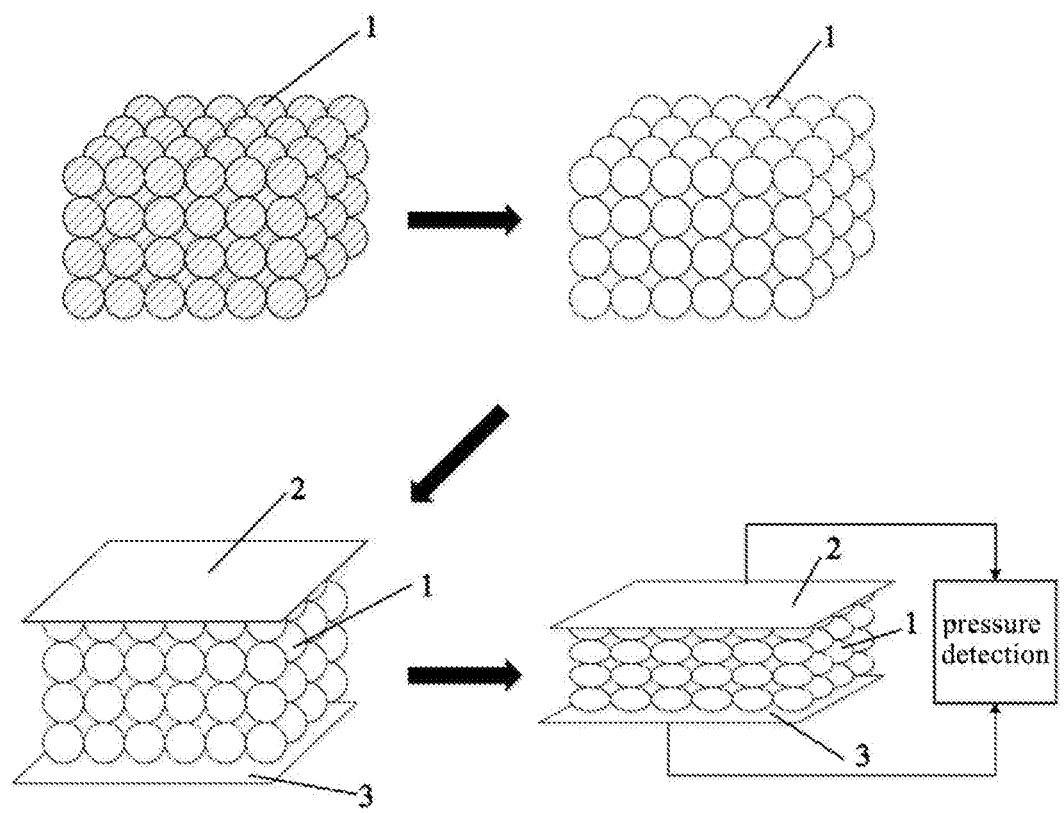
FIG. 3 is another schematic view showing the method for manufacturing the sensor according to some embodiments of the present disclosure.

After the preparation of the piezoresistive material layer 1 in Step 3, as shown in FIG. 3, the first electrode structure 2 and the second electrode structure 3 are formed at an upper side and a lower side of the piezoresistive material layer 1 respectively, so as to prepare the sensor for pressure detection.

Figure 4:
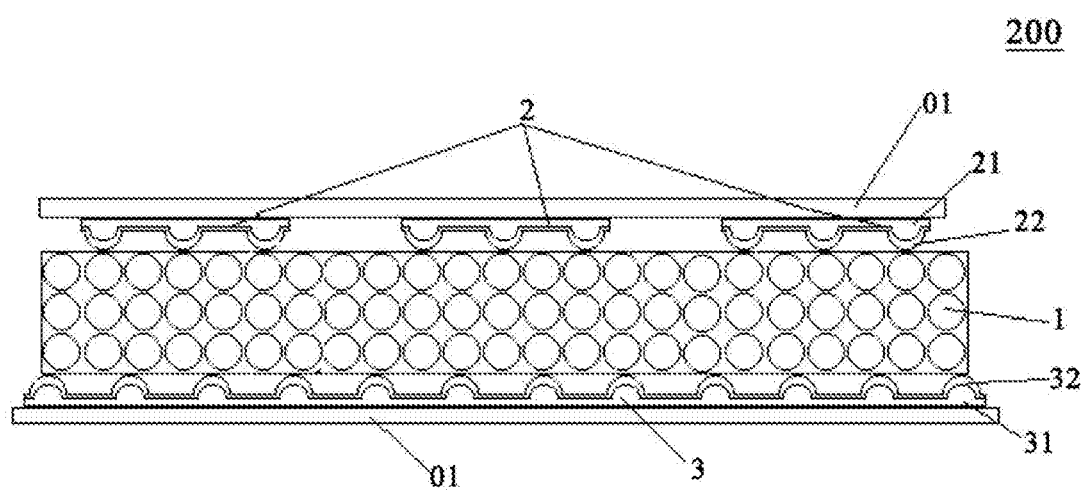
FIG. 4 is a schematic view showing the pressure sensing device according to a second embodiment of the present disclosure.

As shown in FIG. 4, the present disclosure further provides in a second embodiment a pressure sensing device. Different from the pressure sensing device in the first embodiment, a first electrode structure 2 of a sensor 200 may include a plurality of first strip-like electrodes parallel to each other, a second electrode structure 3 of the sensor 200 may include a plurality of second strip-like electrodes parallel to each other, and each first strip-like electrode may intersect the plurality of second strip-like electrodes. Here, as shown in FIG. 4, when the each first strip-like electrode intersects the plurality of second strip-like electrodes, the first strip-like electrode is substantially perpendicular to the plurality of second strip-like electrodes. Of course, it should be appreciated that, the first strip-like electrode is arranged relative to the plurality of second strip-like electrodes by a certain angle according to the practical need, which will not be particularly defined herein.

In the second embodiment of the present disclosure, as shown in FIG. 4, when each of the electrode structures 2, 3 includes an electrode layer and a configuration layer, each of the configuration layer and the electrode layer is formed into a strip-like shape. A pressure sensing element having an upper electrode, a lower electrode and the piezoresistive material layer arranged therebetween is formed at each intersection, and the pressure sensing elements at a plurality of intersections are arranged in a matrix form. Usually, 5 to 50 numbers of first strip-like electrodes and 5 to 50 numbers of second strip-like electrodes are provided, i.e., 5*5 to 50*50 numbers of pressure sensing elements are formed. Each of the first strip-like electrodes and the second strip-like electrodes may have a width of 0.2 cm to 1 cm. The number and the widths of the strip-like electrodes are set according to the practical need, but shall not be limited to those mentioned hereinabove. In addition, in order to support and protect the sensor 200, the pressure sensing device may further include at least one flexible substrate 01 arranged on at least one side of the sensor 200. In other words, the flexible substrate 01 is arranged at one side of the sensor 200, or as shown in FIG. 1, two flexible substrates 01 are arranged at both sides of the sensor 200 respectively.

According to the second embodiment of the present disclosure, each electrode structure is divided into the plurality of strip-like electrodes, so a size of each electrode may not be limited by an electrode manufacture process during the production. In addition, it is able to increase the flexibility of the pressure sensing element, thereby to manufacture a large-size flexible pressure sensing device. Furthermore, each first strip-like electrode may intersect the plurality of second strip-like electrodes, so it is able to determine a position where the pressure is applied.

Figure 5:
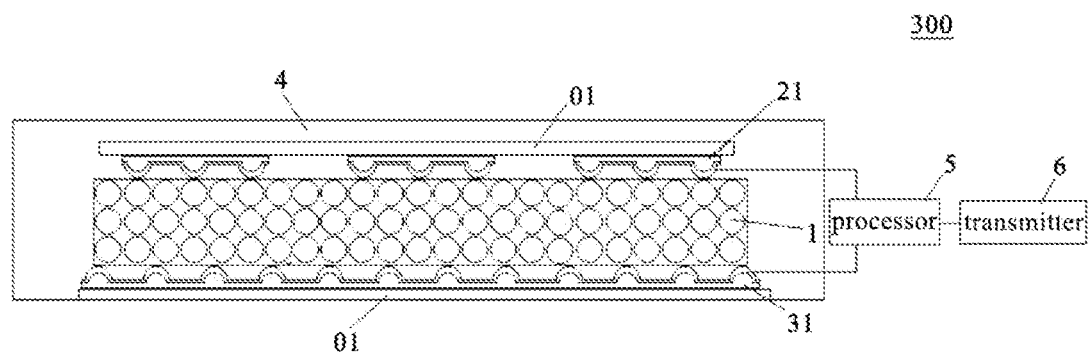
FIG. 5 is a schematic view showing the pressure sensing device according to a third embodiment of the present disclosure.

As shown in FIG. 5, the present disclosure further provides in a third embodiment a pressure sensing device. Different from that in the second embodiment, the pressure sensing element may further include a processor 5 electrically coupled to a sensor 300, and configured to receive an electrical signal from the sensor 300, and convert the electrical signal into a pulse signal or a heartbeat signal.

In the third embodiment of the present disclosure, through the additional processor 5, it is able to detect a pressure change caused by a pulse or heartbeat through the processor 300, and convert the pressure change into the corresponding pulse signal or heartbeat signal. In other words, the pressure sensing device is applied to a flexible wearable pulse or heartbeat detection device.

In the third embodiment of the present disclosure, the pressure sensing device may further include a transmitter 6 coupled to the processor 5, and configured to transmit the pulse signal or the heartbeat signal to an external reception device. Through the additional transmitter 6, it is able to transmit the pulse signal or the heartbeat signal, thereby to transmit and store the acquired data, e.g., monitor a health condition of a relative in a real-time and remote manner, or monitor and record a heart rate through a mobile phone during exercise. The transmitter 6 is a wireless transmission module, e.g., Bluetooth, and the external reception device is a mobile terminal such as a smart phone. The pressure sensing device may further include a power source and a power supply circuitry, so as to supply power to the processor 5 and the transmitter 6.

In some possible embodiments of the present disclosure, as shown in FIG. 5, the pressure sensing device may further include an attachment layer 4 covering a surface of the sensor 300. Through the attachment layer 4, it is able to fix the pressure sensing device to an object by which the pressure sensing device is to be adopted. The attachment layer 4 is, e.g., an adhesive layer. For example, when the pressure sensing device is a pulse monitoring device, it is fixed to a corresponding skin through the attachment layer 4.

In some possible embodiments of the present disclosure, the first electrode structure 2 is a whole-surface structure, rather than consisting of the first strip-like electrodes parallel to each other. In addition, the second electrode structure 3 may also be a whole-surface structure, rather than consisting of the second strip-like electrodes parallel to each other.

Figure 6:
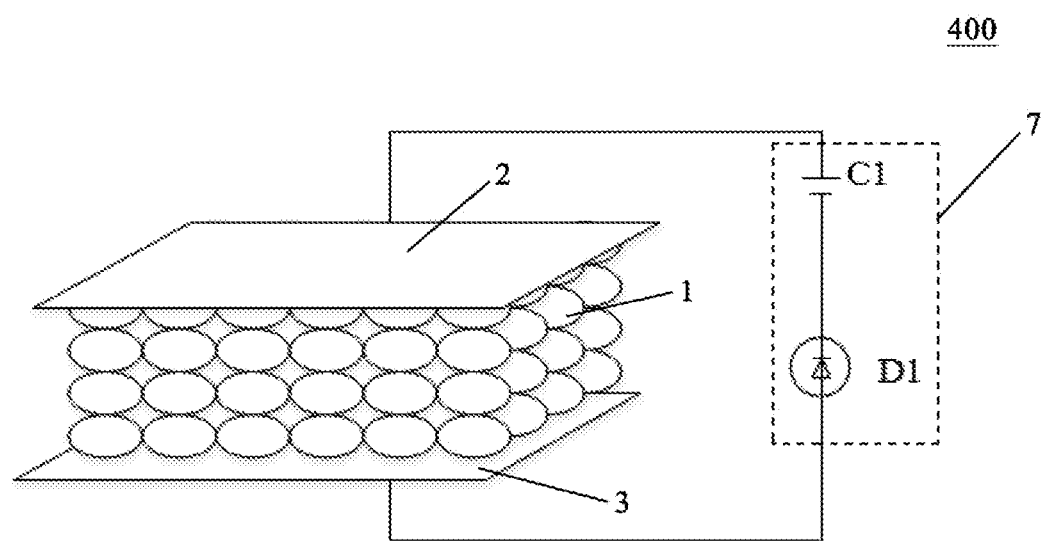
FIG. 6 is a schematic view showing the pressure sensing device according to a fourth embodiment of the present disclosure.

As shown in FIG. 6, the present disclosure further provides in a fourth embodiment a pressure sensing device. Different from that mentioned in the first embodiment and the second embodiment, the pressure sensing device may further include an indicator 7 (indicated by a dotted box in FIG. 6) electrically coupled to a sensor 400 and configured to indicate a level of a pressure applied to the sensor 400.

In some possible embodiments of the present disclosure, as shown in FIG. 6, each of the first electrode structure 2 and the second electrode structure 3 is of a sheet-like shape, the indicator 7 may include an LED lamp D1 coupled in series to the sensor 400 and configured to display different colors in accordance with different voltages applied thereto.

Figure 7:
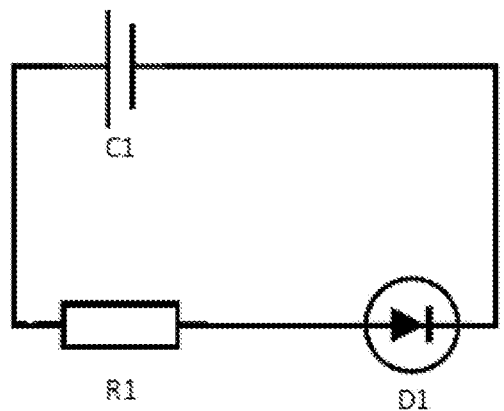
FIG. 7 is a schematic view showing an equivalent circuit of the pressure sensing device during the operation according to the fourth embodiment of the present disclosure.

For example, as shown in FIG. 6 and FIG. 7, the LED lamp is a full-color LED lamp. For a specific circuit structure, the LED D1, the sensor 400 and a voltage-constant source C1 (or a direct current voltage-stabilized source capable of applying a stable voltage) are coupled in series to each other, and a constant voltage applied by the voltage-constant source C1 is shared by the LED lamp D1 and the sensor 400. In the fourth embodiment of the present disclosure, a resistance of the sensor 400 may decrease along with an increase in a pressure applied thereto. As shown in FIG. 7, the sensor 400 is equivalent to a variable resistor R1. When the pressure applied to the sensor 400 increases gradually, its resistance may decrease gradually, the voltage applied to the sensor 400 may decrease gradually, and the voltage applied to the LED lamp D1 may increase gradually.

Figure 8:
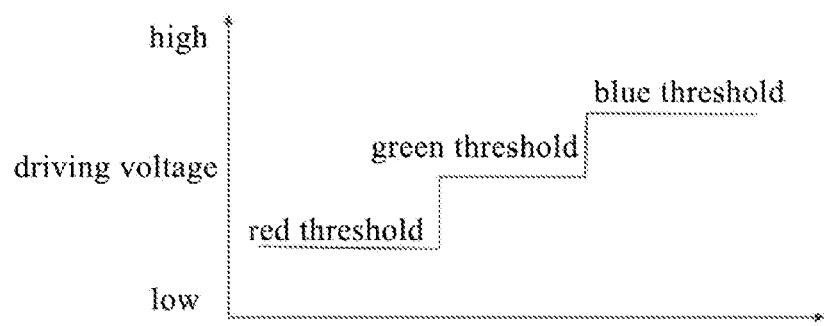
FIG. 8 is a schematic view showing a correspondence between colors displayed by a full-color LED lamp and levels of a driving voltage according to the fourth embodiment of the present disclosure.

As shown in FIG. 8, for the full-color LED lamp, when the voltage applied thereto is smaller than or equal to a first threshold (i.e., a red (R) threshold), an R color is displayed; when the voltage applied thereto is greater than the first threshold and smaller than or equal to a second threshold (i.e., a green (G) threshold), a G color is displayed; and when the voltage applied thereto is greater than the second threshold (i.e., the blue (B) threshold), the B color is displayed. For example, a driving voltage of the LED lamp for displaying the red color is set as 2V to 3V, a driving voltage for displaying the green color is set as 3V to 4V, and a driving voltage for displaying the blue color is set as 4V to 5V. In some other embodiments of the present disclosure, the values of the driving voltages are adjusted according to the practical need. In other words, as shown in FIG. 6 and FIG. 7, in the fourth embodiment of the present disclosure, when the sensor 400 is not pressed, it is necessary to set the voltage shared by the LED lamp D1 as the driving voltage for displaying the red color. The level of the pressure is intuitively indicated by the LED lamp D1 in different colors. In some other possible embodiments of the present disclosure, any other indicator 7 may also be adopted to indicate the level of the pressure applied to the sensor 400.

In some possible embodiments of the present disclosure, the first electrode structure 2 may consist of a plurality of first strip-like electrodes arranged parallel to each other, and the second electrode structure 3 may consist of a plurality of second strip-like electrodes arranged parallel to each other. In other words, the first electrode structure 2 may include the plurality of first strip-like electrodes parallel to each other, the second electrode structure 3 may include the plurality of second strip-like electrodes parallel to each other, and each first strip-like electrode may intersect the plurality of second strip-like electrodes. Here, as shown in FIG. 4, when each first strip-like electrode intersects the plurality of second strip-like electrodes, the first strip-like electrode is substantially perpendicular to the plurality of second strip-like electrodes. Of course, it should be appreciated that, the first strip-like electrode is arranged relative to the plurality of second strip-like electrodes by a certain angle according to the practical need, which will not be particularly defined herein.

Figure 9:
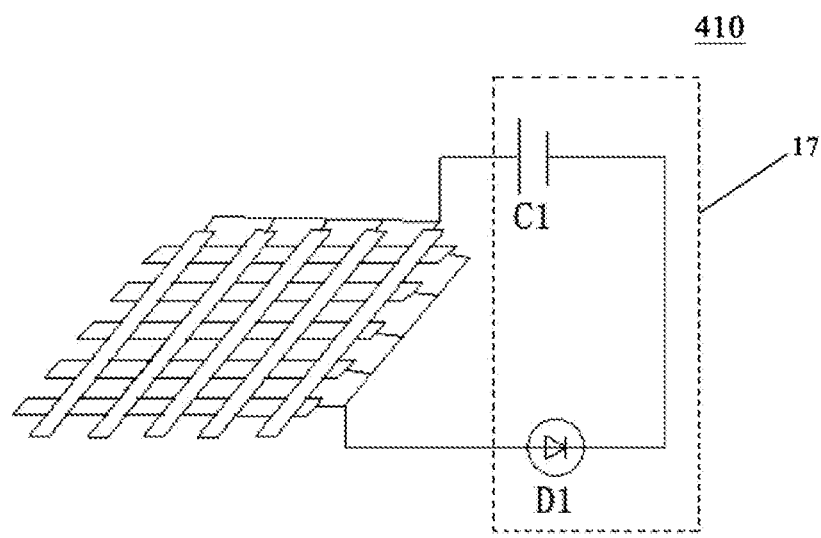
FIG. 9 is another schematic view showing the pressure sensing device according to the fourth embodiment of the present disclosure.

As shown in FIG. 9, an indicator 17 (indicated by a dotted box in FIG. 9) may include an LED lamp D1, one end of which is coupled to one end of each first strip-like electrode, and the other end of which is coupled to one end of each second strip-like electrode. In a specific circuit structure, a power source C1 capable of providing a constant voltage is coupled in series to the LED lamp D1. The indicator 17 is configured to indicate a level of the pressure applied to an entire sensor 410.

Figure 10:
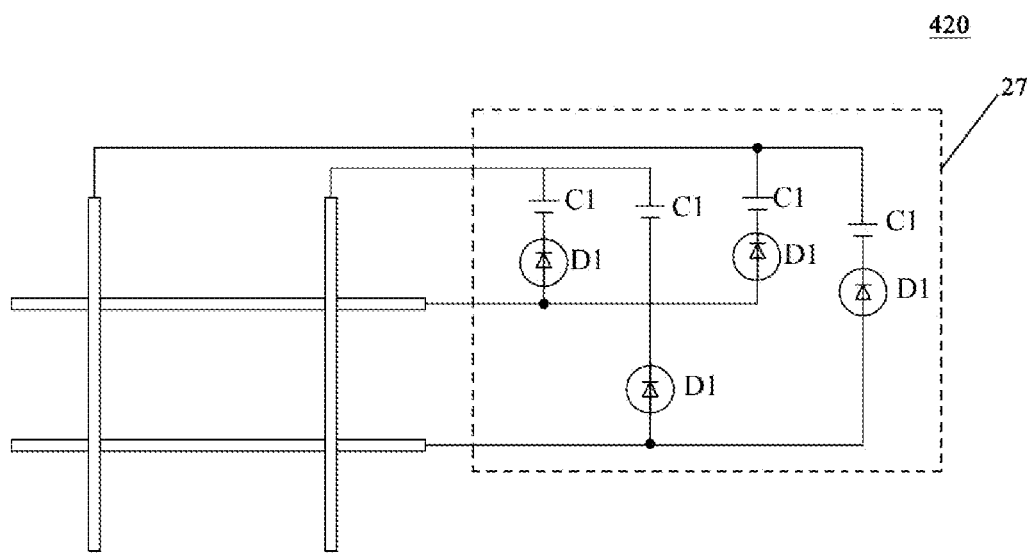
FIG. 10 is yet another schematic view showing the pressure sensing device according to the fourth embodiment of the present disclosure.

In another possible embodiment of the present disclosure, the first electrode structure 2 may include a plurality of first strip-like electrodes parallel to each other, the second electrode structure 3 may include a plurality of second strip-like electrodes parallel to each other, and each first strip-like electrode may intersect the plurality of second strip-like electrodes so as to form a plurality of pressure sensing elements. As shown in FIG. 10, an indicator 27 (indicated by a dotted box in FIG. 10) may include a plurality of LED lamps D1 corresponding to the plurality of pressure sensing elements in a one-to-one correspondence manner, one end of each LED lamp D1 is coupled to an end of the first strip-like electrode of a corresponding pressure sensing element, and the other end of each LED lamp D1 is coupled to an end of the second strip-like electrode of the corresponding pressure sensing element. In a specific circuit structure, a power source C1 capable of providing a constant voltage is coupled in series to the LED lamps D1. Each LED lamp D1 is configured to indicate a level of the pressure applied to the pressure sensing element at an intersection between the first strip-like electrode and the corresponding second strip-like electrode on a sensor 420.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pressure sensing device, comprising a sensor, wherein the sensor comprises a sheet-like: piezoresistive material layer, and a first electrode structure and the second electrode structure arranged at opposite sides of the piezoresistive material layer respectively, wherein at least one of the first electrode structure and the second electrode structure is provided with one or more protrusions at a surface facing the piezoresistive material layer, wherein the surface facing the piezoresistive material layer with the one or more protrusions forms an uneven surface.

2. The pressure sensing device according to claim 1, wherein when the sensor is not pressed, the uneven surface of the at least one of the first electrode structure and the second electrode structure is in incomplete contact with the piezoresistive material layer.

3. The pressure sensing device according to claim 1, further comprising at least one flexible substrate, wherein the at least one flexible substrate is arranged at a surface of at least one of the first electrode structure and the second electrode structure facing away from the piezoresistive material layer.

4. The pressure sensing device according to claim 1, wherein the piezoresistive material layer comprises porous foam body and graphene particles absorbed on the porous foam body.

5. The pressure sensing device according to claim 1, wherein the first electrode structure comprises a first configuration layer and a first electrode layer arranged between the first configuration layer and the piezoresistive material layer, the first configuration layer is provided with the uneven surface facing the piezoresistive material layer, and the first electrode layer is coated onto the first configuration layer; and/or the second electrode structure comprises a second configuration layer and a second electrode layer arranged between the second configuration layer and the piezoresistive material layer, the second configuration layer is provided with the uneven surface facing the piezoresistive material layer, and the second electrode layer is coated onto the second configuration layer.

6. The pressure sensing device according to claim 5, wherein the surface of at least one of the first configuration layer and the second configuration layer facing the piezoresistive material layer is provided with a plurality of convex points arranged in a matrix form, wherein the surface of at least one of the first configuration layer and the second configuration layer facing the piezoresistive material layer with the plurality of convex points forms the uneven surface.

7. The pressure sensing device according to claim 1, wherein the first electrode structure comprises a plurality of first strip-like electrodes arranged parallel to each other, the second electrode structure comprises a plurality of second strip-like electrodes arranged parallel to each other, and each first strip-like electrode intersects the plurality of second strip-like electrodes.

8. The pressure sensing device according to claim 1, further comprising an attachment layer covering a surface of the sensor, wherein the surface of the sensor is a surface of at least one of the first electrode structure and the second electrode structure facing away from the piezoresistive material layer.

9. The pressure sensing device according to claim 1, further comprising an indicator electrically coupled to the sensor and configured to indicate a level of a pressure applied to the sensor.

10. The pressure sensing device according to claim 9, wherein each of the first electrode structure and the second electrode structure is of a sheet-like shape, the indicator comprises a Light-Emitting Diode (LED) lamp coupled in series to the sensor and configured to display different colors in accordance with different voltages applied thereto.

11. The pressure sensing device according to claim 9, wherein the first electrode structure comprises a plurality of first strip-like electrodes arranged parallel to each other, the second electrode structure comprises a plurality of second strip-like electrodes arranged parallel to each other, each first strip-like electrode intersects the plurality of second strip-like electrodes, and the indicator comprises an LED lamp, one end of which is coupled to one end of each first strip-like electrode, and the other end of which is coupled to one end of each second strip-like electrode.

12. The pressure sensing device according to claim 9, wherein the first electrode structure comprises a plurality of first strip-like electrodes arranged parallel to each other, the second electrode structure comprises a plurality of second strip-like electrodes arranged parallel to each other, each first strip-like electrode intersects the plurality of second strip-like electrodes to form a plurality of pressure sensing elements, the indicator comprises a plurality of LED lamps corresponding to the plurality of pressure sensing elements in a one-to-one correspondence manner, one end of each LED lamp is coupled to an end of the first strip-like electrode of a corresponding pressure sensing element, and the other end of each LED lamp is coupled to an end of the second strip-like electrode of the corresponding pressure sensing element.

13. The pressure sensing device according to claim 10, wherein the LED lamp is a full-color LED lamp.

14. The pressure sensing device according to claim 13, wherein when the voltage applied to the LED lamp is smaller than or equal to a first threshold, a red (R) color is displayed by the LED lamp, when the voltage applied to the LED lamp is greater than the first threshold and smaller than or equal to a second threshold, a green (G) color is displayed by the LED lamp, and when the voltage applied to the LED lamp is greater than the second threshold, a blue (B) color is displayed by the LED lamp.

15. The pressure sensing device according to claim 1, further comprising a processor electrically coupled to the sensor, and configured to receive an electrical signal from the sensor, and convert the electrical signal into a pulse signal or a heartbeat signal.

16. The pressure sensing device according to claim 15, further comprising a transmitter coupled to the processor, and configured to transmit the pulse signal or the heartbeat signal to an external reception device.

17. A method for manufacturing a sensor of the pressure sensing device according to claim 1, comprising:
coating an insulation flexible material onto a template with concave points arranged in a matrix form;
molding and baking the insulation flexible material on the template to form a thin film with convex points arranged in a matrix form, so as to prepare a configuration layer;
removing the thin film with the convex points off from the template;
forming an electrode layer on a surface of the thin film with the convex points through plating, so as to prepare at least one electrode structure; and
after the acquisition of the at least one electrode structure, arranging the at least one electrode structure in such a manner that a surface of the at least one electrode structure with the convex points is located at an upper or lower side of a sheet-like piezoresistive material layer, so as to prepare the sensor having the at least one electrode structure with a non-planar surface.

18. The method according to claim 17, wherein the non-planar surface of the at least one electrode structure is uneven.

19. A method for manufacturing a piezoresistive material layer of the pressure sensing device according to claim 1, comprising:
forming a porous foam body made of a polyurethane (PU) material into a sheet-like structure;
immersing the porous foam body into a graphene-dispersed solvent, so as to enable the porous foam body to absorb an entirety of graphene particles; and
baking an entirety of the porous foam body absorbing the graphene particles so as to prepare the piezoresistive material layer which is electrically conductive.

20. The method according to claim 19, wherein the sheet-like structure has a thickness of 1 mm to 10 mm.

* * * * *